United States Patent [19]

Miyamoto

[11] Patent Number: 4,934,036
[45] Date of Patent: Jun. 19, 1990

[54] APPARATUS FOR ASSEMBLING A SEAT FOR USE IN AN AUTOMOBILE

[75] Inventor: Masanori Miyamoto, Hiroshima, Japan

[73] Assignee: Delta Kogyo Co., Ltd., Hiroshima, Japan

[21] Appl. No.: 340,674

[22] Filed: Apr. 20, 1989

[30] Foreign Application Priority Data

Apr. 20, 1988 [JP] Japan .............................. 63-54091[U]

[51] Int. Cl.⁵ .............................................. B25B 27/14
[52] U.S. Cl. ....................................... 29/281.4; 269/71
[58] Field of Search ................... 269/71, 73, 74, 76, 269/79, 56, 57, 68–69; 29/281.1, 281.4, 281.5, 91.1, 91.5, 240, 822, 823

[56] References Cited

U.S. PATENT DOCUMENTS

| | | |
|---|---|---|
| 2,390,428 | 12/1945 | Disse .................................... 269/71 |
| 2,786,434 | 3/1957 | Klungtvedt ........................... 269/71 |
| 2,835,964 | 5/1958 | Yarwood ............................... 269/71 |
| 3,027,158 | 3/1962 | Barbee .................................. 269/71 |
| 3,106,111 | 10/1963 | Denisco ................................ 269/71 |
| 3,168,893 | 2/1965 | Johnson ................................ 269/71 |
| 4,294,440 | 10/1981 | Severt ................................... 269/71 |
| 4,317,560 | 3/1982 | Troyer .................................. 269/71 |

*Primary Examiner*—Robert C. Watson
*Attorney, Agent, or Firm*—Wenderoth, Lind & Ponack

[57] ABSTRACT

The disclosure relates to an apparatus for assembling a seat for use in an automobile. The seat assembling apparatus comprises a rotary table which is horizontally rotatable; a setting table which is mounted on the rotary table and is horizontally and vertically movable, and on which a seat slider is placed in position; a rotation locking mechanism for locking the rotary table at a predetermined rotational position thereof; a locking mechanism for locking the seat slider on the setting table; and a pivot locking mechanism for locking the setting table in an upper set position.

17 Claims, 21 Drawing Sheets

Fig.3(a)
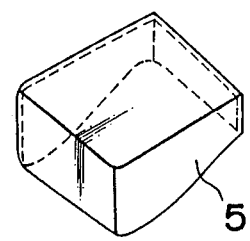
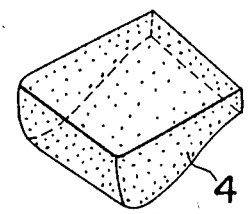
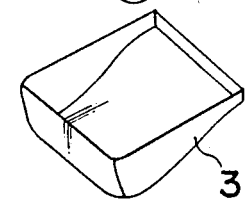
Fig.2(a)
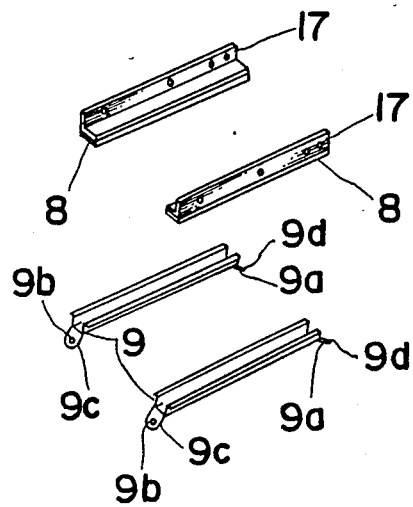
Fig.2(b)
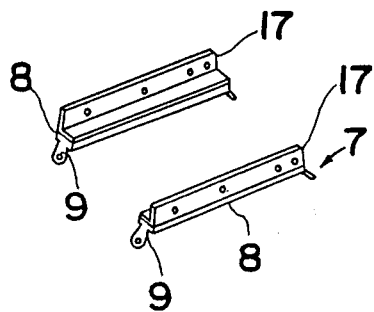
Fig.3(b)
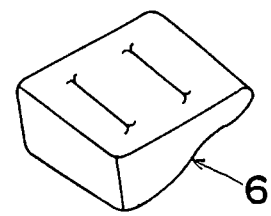

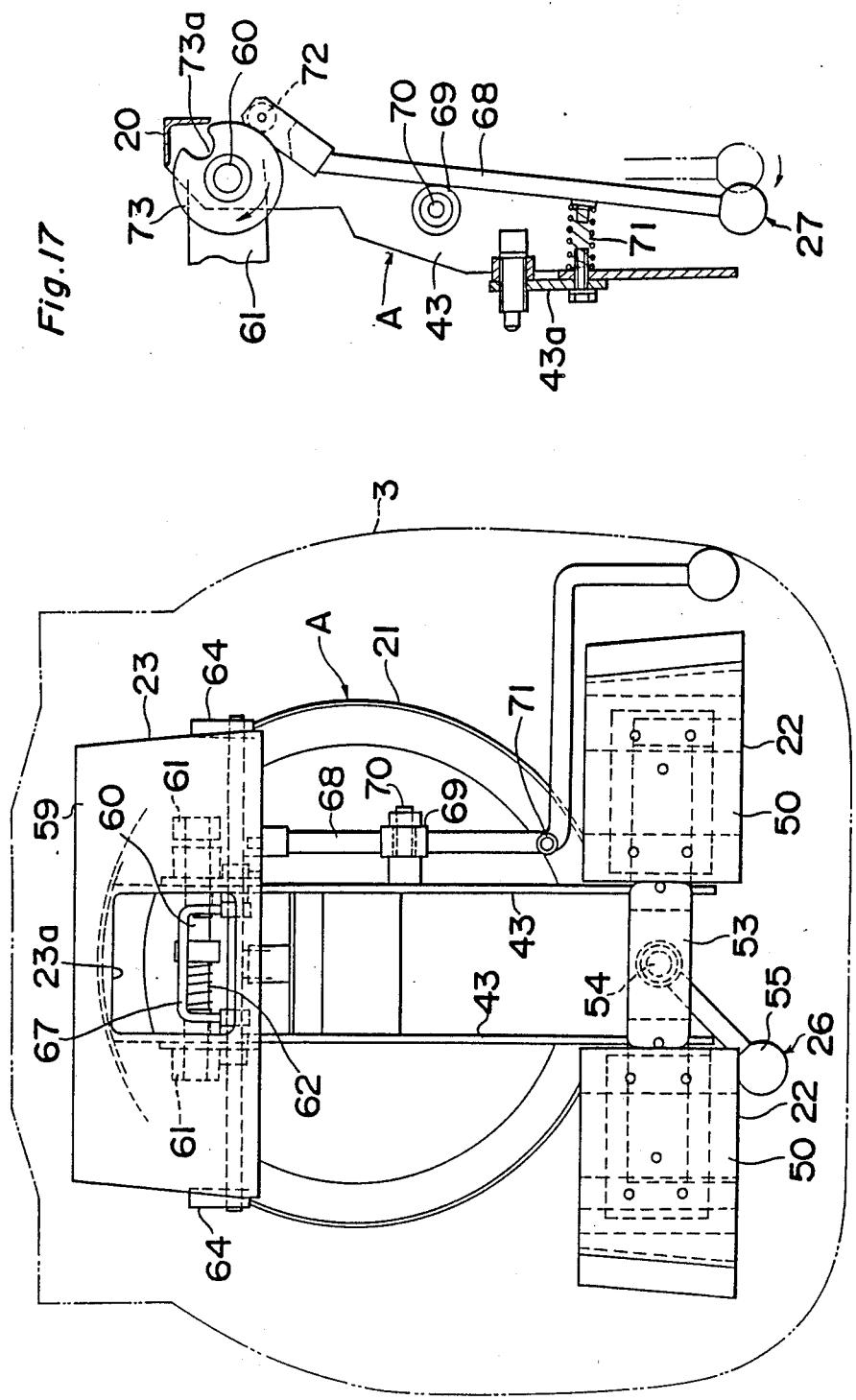

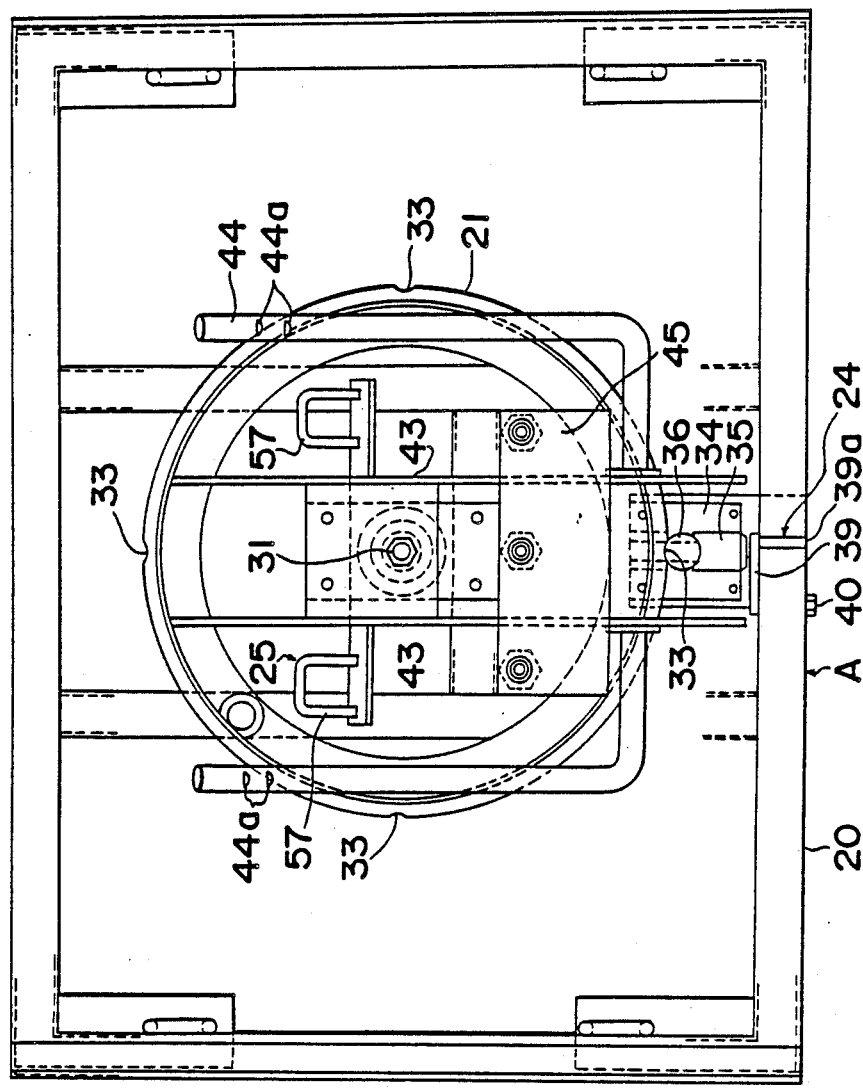

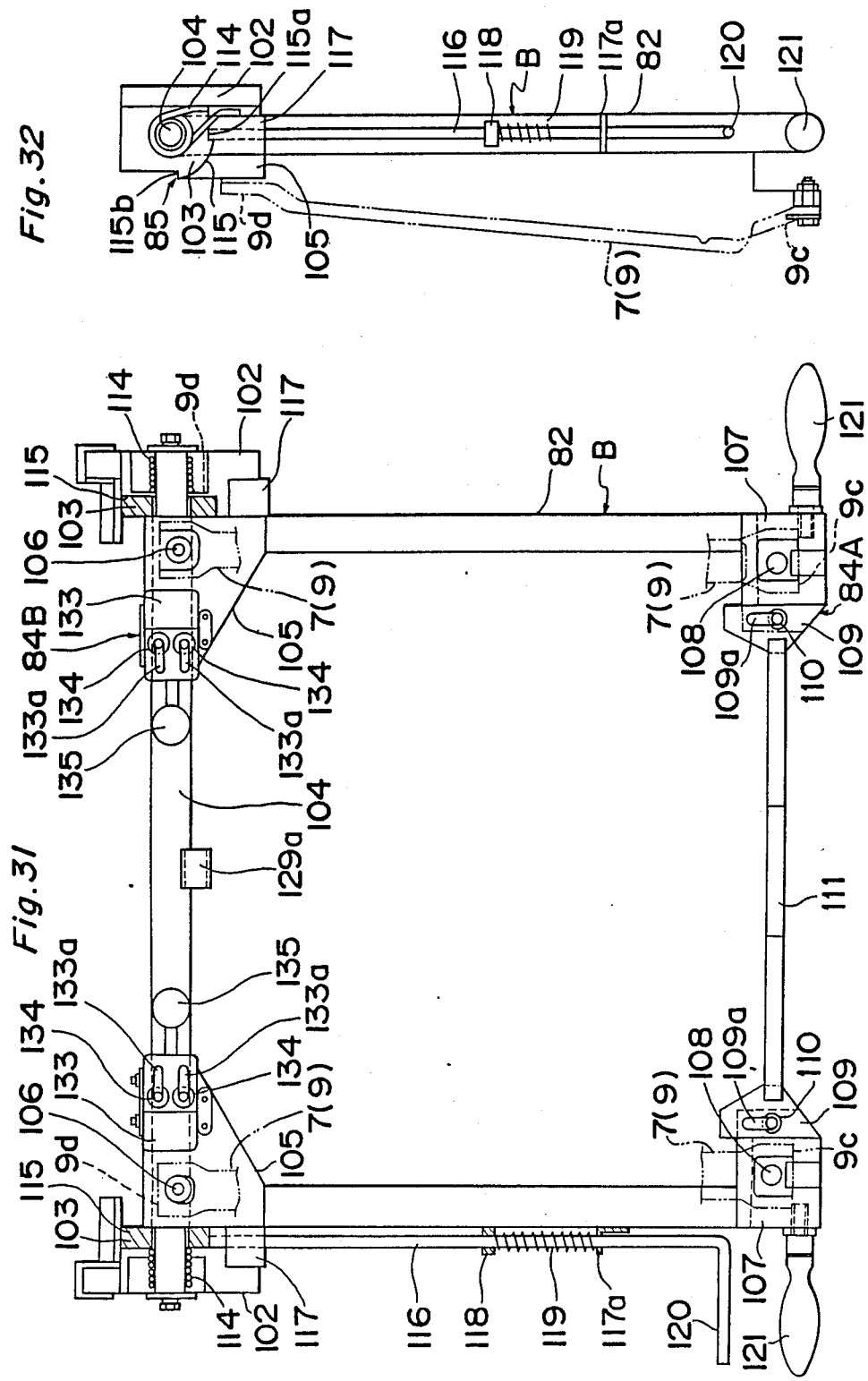

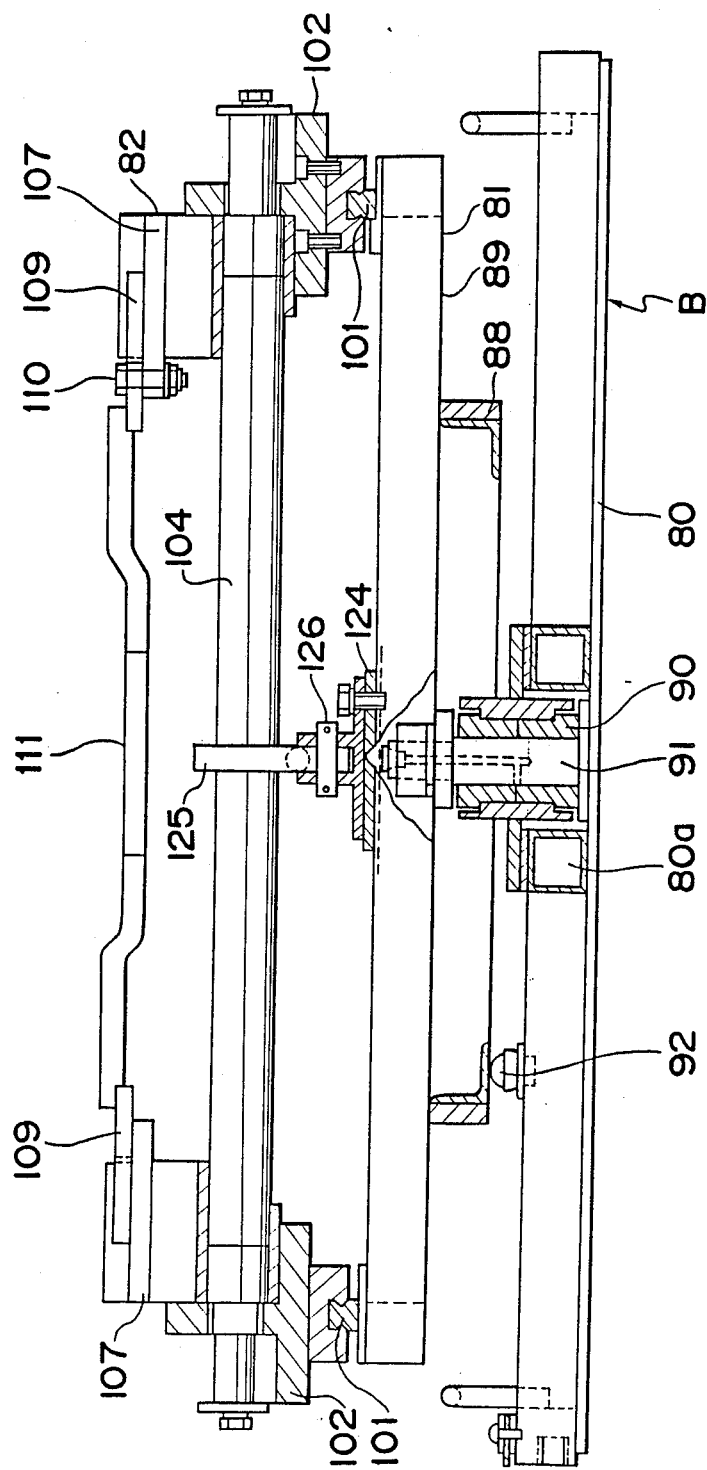

APPARATUS FOR ASSEMBLING A SEAT FOR USE IN AN AUTOMOBILE

BACKGROUND OF THE INVENTION

1. Field of the Invention

The present invention relates to an apparatus for assembling a seat for use in an automobile.

2. Description of the Prior Art

Heretofore, in the line for manufacturing a seat for use in an automobile, a seat cushion assembling apparatus and a seat back apparatus are alternately placed on a belt conveyor. In this seat manufacturing line, using the seat cushion assembling apparatus, a seat cushion pad is placed on a seat cushion frame, then the seat cushion frame is covered with a seat cushion trim. Thus, a seat cushion is manufactured. A seat back is manufactured by using the apparatus for assembling the seat back. That is, a seat back pad is placed on a seat back frame, then, the seat back frame is covered with a seat back trim. Thereafter, using a seat assembling apparatus, the seat cushion is mounted on a seat slider and the seat back is mounted on the seat cushion. Thus, the seat is manufactured on the belt conveyor.

However, since the seat is manufactured by using the belt conveyor in the above-described process, the seat slider is not stabilized. Therefore, it requires a considerable amount of skill to preferably mount the seat cushion on the seat slider or mount the seat back on the seat cushion.

Further, hard labor is required because a worker is required to raise up and manually rotate the heavy seat slider in mounting the seat cushion on the seat slider and mounting the seat back on the seat cushion.

SUMMARY OF THE INVENTION

It is therefore the essential object of the present invention to provide an apparatus for assembling a seat for use in an automobile which can overcome the disadvantage described above and facilitates the manufacturing of a seat.

In accomplishing the above-described object, the apparatus for assembling a seat for use in an automobile in accordance with the present invention comprises a rotary table which is horizontally rotatable; a setting table which is mounted on the rotary table, horizontally and vertically movable, and on which a seat slider is placed in position; a rotation locking mechanism for locking the rotary table at a predetermined rotational position thereof; a locking mechanism for locking the seat slider on the setting table; and a pivot locking mechanism for locking the setting table in an upward pivot position.

In accordance with the present invention, since the seat slider placed on the setting table on the rotary table disposed above the base is locked by the locking mechanism, the seat slider is stabilized in the setting table. Accordingly, even those not skilled in the art can easily mount the seat cushion on the seat slider and mount the seat back on the seat cushion.

Further, since the setting table can be horizontally rotated by the rotary table which is manually rotated without applying a great amount of force thereto and the rotation locking mechanism locks the rotary table at a predetermined position thereof, standing alongside the belt conveyor, a worker can easily mount the seat cushion on the seat slider and mount the seat back on the seat cushion.

Furthermore, since the pivot locking mechanism is capable of locking the setting table in the upper set position, the operation for mounting parts on the bottom face of the seat cushion can be easily performed.

In addition, standing alongside the belt conveyor, the worker can easily perform his allotted work with his hands as high as his waist. Therefore, the seat is manufactured by one manufacturing line in which seat cushion assembling apparatus and seat assembling apparatus are alternately placed. Thus, seat manufacturing efficiency can be greatly improved.

BRIEF DESCRIPTION OF THE DRAWINGS

These and other objects and features of the present invention will become clear from the following description taken in conjunction with the preferred embodiments thereof with reference to the accompanying drawings, in which:

FIG. 2(a) is an exploded perspective view showing a seat slider;

FIG. 2(b) is a perspective view showing the seat slider;

FIG. 3(a) is an exploded perspective view showing a seat cushion;

FIG. 3(b) is a perspective view showing the seat cushion;

FIG. 16 is a plan view of the widening/narrowing mechanism and the upward/downward pivoting mechanism of the seat cushion assembling apparatus (A);

FIG. 17 is a side elevational view of the mechanisms shown in FIG. 16;

FIG. 18 is a plan view showing the rotary table, setting arm, and locking mechanism of the seat cushion assembling apparatus (A);

FIG. 31 is a front view showing the locking mechanism and pivot locking mechanism of the seat assembling apparatus (B);

FIG. 32 is a side elevational view of the mechanisms shown in FIG. 31;

FIG. 35 is a sectional view of the seat assembling apparatus (B).

DETAILED DESCRIPTION OF THE INVENTION

Figure 1:
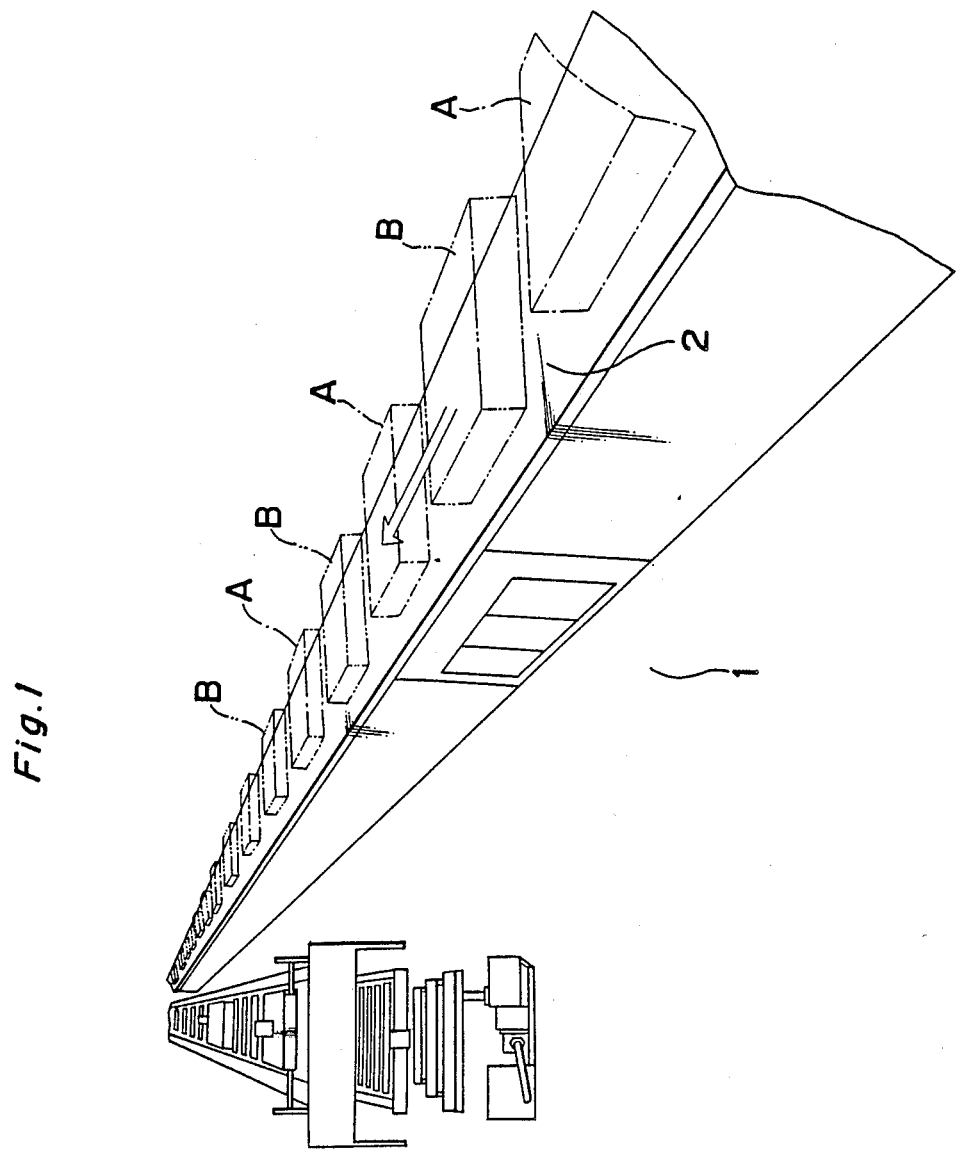
FIG. 1 is a perspective view of a seat manufacturing line.

Before the description of the present invention proceeds, it is to be noted that like parts are designated by like reference numerals throughout the accompanying drawings.

Referring to FIG. 1, in the line for manufacturing the seat for use in an automobile, a belt conveyor 2 is arranged as high as the waist of a worker who is doing his/her allotted job on the floor 1. Seat cushion assembling apparatus (A) and seat assembling apparatus (B) are alternately arranged on the belt conveyor 2 moving at a low speed. Thus, the conveyor system works with workers standing alongside the belt conveyor 2.

In the apparatus (A) for assembling a seat cushion, as shown in FIG. 3(a), a seat cushion frame 3 is covered with a seat cushion trim 5 with a seat cushion pad 4 applied to the seat cushion frame 3, then the end portion of the seat cushion trim 5 is wound around the seat cushion frame 3, thereafter the end portion of the seat cushion trim 5 is fastened to the seat cushion frame 3. Thus, a seat cushion 6 is manufactured.

A seat slider 7 as shown in FIG. 2(b) is manufactured by engaging a lower rail 9 and an upper rail 8, on which an L-shaped bracket 17 is mounted, with each other in a manufacturing process different from the process for manufacturing the seat cushion.

Figure 4A:
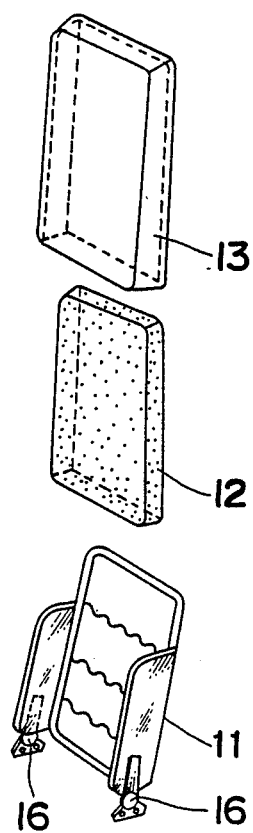
FIG. 4(a) is an exploded perspective view showing a seat back.
Figure 4B:
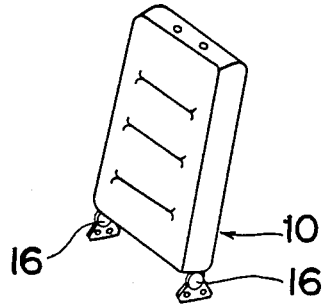
FIG. 4(b) is a perspective view showing the seat back.
Figure 5B:
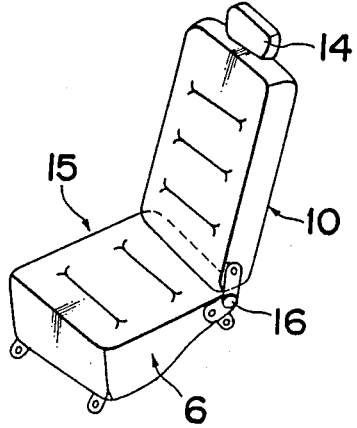
FIG. 5(b) is a perspective view showing the seat back in combination with a seat cushion and a seat slider.

Referring to FIG. 4(a), a seat back 10 as shown in FIG. 4(b) is manufactured by using the seat back assembling apparatus (not shown) as follows in a process different from the process for manufacturing the seat cushion. First, reclining brackets 16 are mounted on a seat back frame 11, then the seat back frame 11 is covered with a seat back trim 13 with the seat back pad 12 applied to the seat back frame 11. Thereafter, the end portion of the seat back trim 13 is wound around the seat back frame 11. Then, the end portion of the seat back trim 13 is fastened to the seat back frame 11. Using the seat cushion assembling apparatus (A), a particular operation, for example, a parts-mounting operation, can be performed.

Figure 5A:
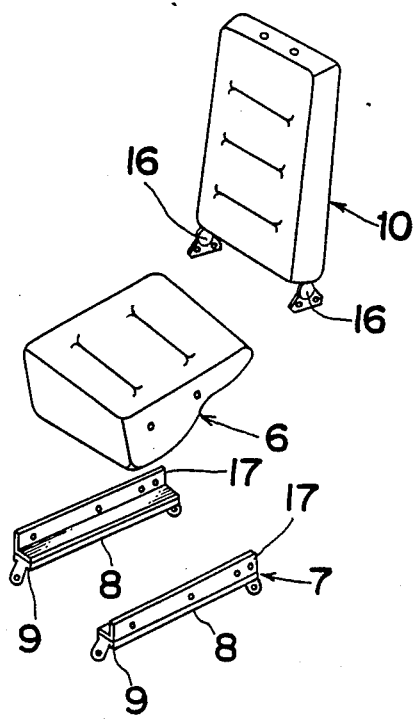
FIG. 5(a) is an exploded perspective view showing the seat back in combination with a seat cushion and a seat slider.

A seat 15 as shown in FIG. 5(a) is manufactured by using the seat assembling apparatus (B). As shown in FIG. 5(a), the seat back 10 is mounted on the L-shaped brackets 17 of the seat slider 7, and the seat cushion 6 is mounted on reclining brackets 16. Thereafter, a head wrest 14 is attached to the seat back 10.

Seat cushion assembling apparatus (A)

FIG. 6 through FIG. 20 show a seat cushion assembling apparatus (A).

Figure 6:
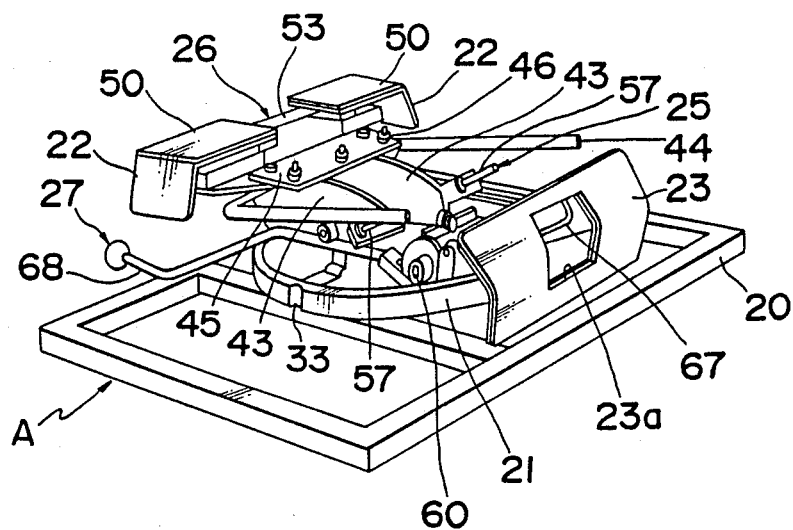
FIG. 6 is a perspective view showing the downward set position of a second setting table of a seat cushion assembling apparatus (A)

As shown in FIG. 6, the seat cushion assembling apparatus (A) essentially comprises a horizontally rotatable rotary table 21 mounted on a base 20; a pair of first setting tables 22, 22 and a second setting table 23 which is mounted on the rotary table 21 and on which the seat cushion frame 3 is placed in position; a rotation locking mechanism 24 (refer to FIG. 9) for locking the rotary table 21 at a predetermined rotational position thereof; a locking mechanism 25 for locking the seat cushion frame 3 on the first setting tables 22, 22. A widening/narrowing mechanism 26 for widening the distance between the first setting tables 22 and 22 when the seat cushion 6 is placed thereon and narrowing the distance between the first setting tables 22, 22 when the seat back 10 is placed thereon; and an upward/downward pivoting mechanism 27 for pivoting the second setting table 23 downward when the seat cushion frame 3 is placed thereon with the bottom surface of the seat cushion frame 3 upward (refer to FIG. 7) and pivoting the second setting table 23 upward when the seat cushion frame 3 (seat cushion sub-assembled frame 3) is placed thereon with the top surface thereof upward (refer to FIG. 11).

Figure 20:
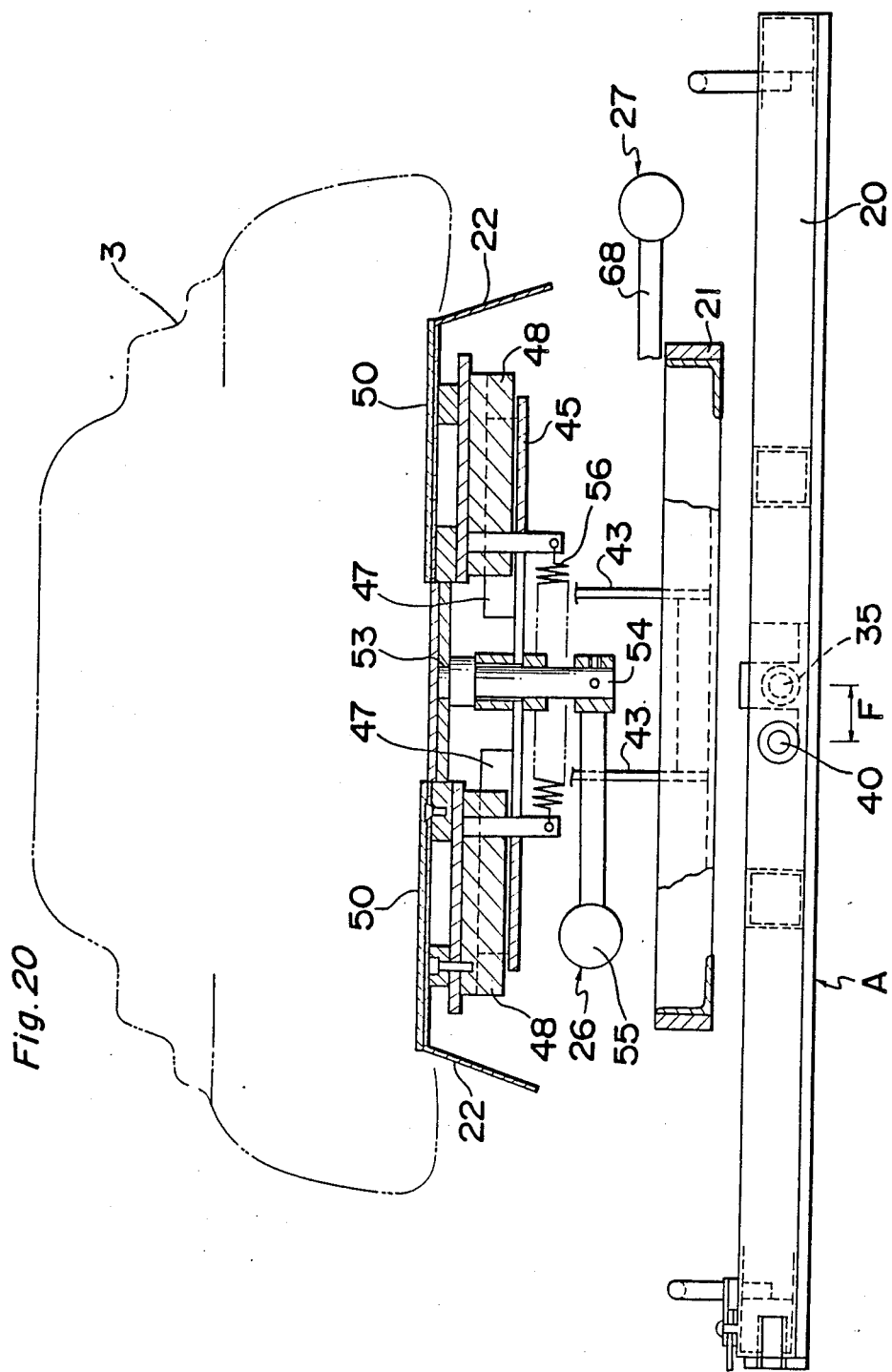
FIG. 20 is a front view of the seat cushion assembling apparatus (A)

As shown in FIGS. 6 and 20, the base 20 comprises rectangular frames. It is placed on the belt conveyor 2.

Figure 19:
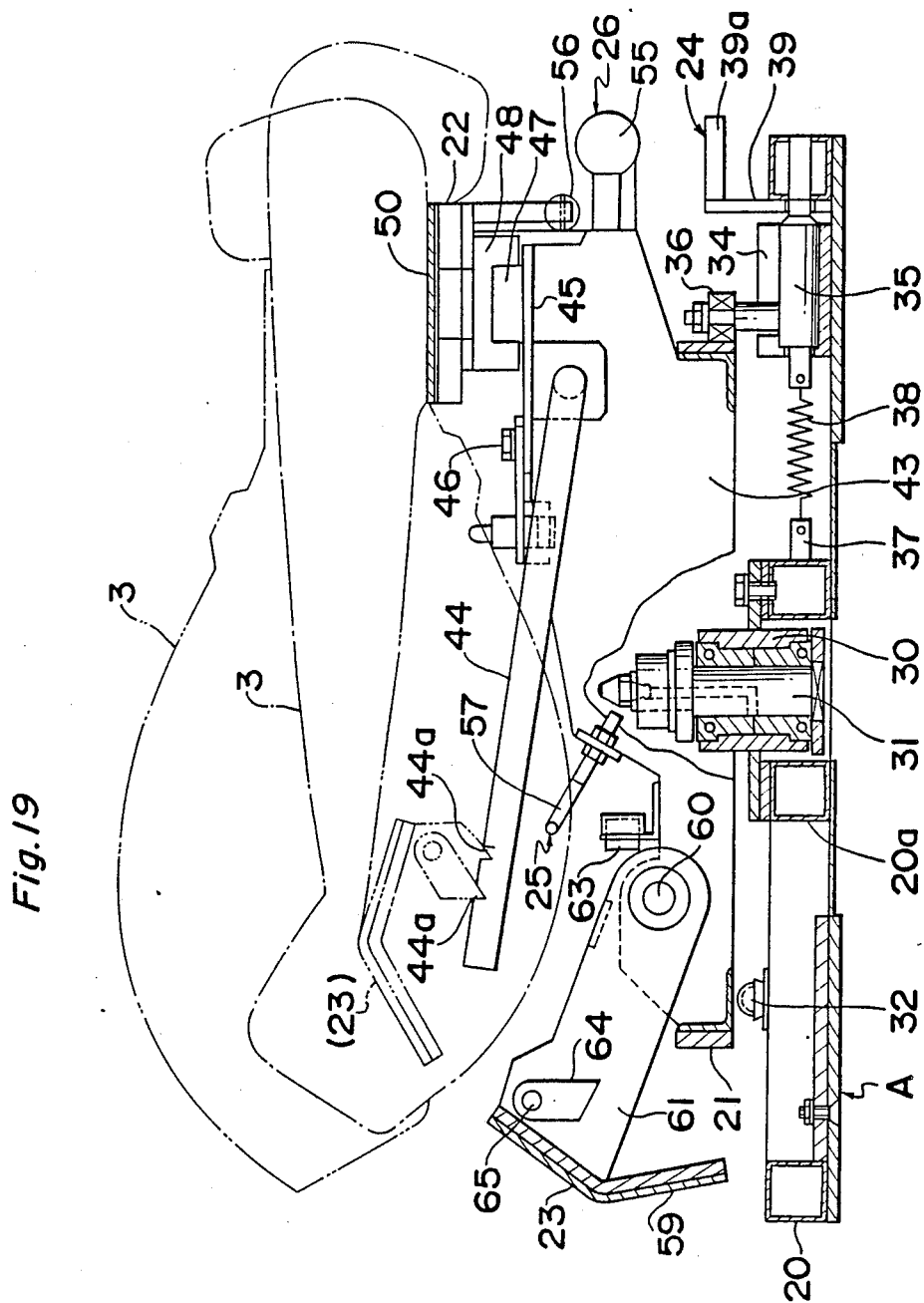
FIG. 19 is a side elevational view of the seat cushion assembling apparatus (A)

As shown in FIGS. 6 and 18, the rotary table 21 comprises a circular frame. As shown in FIG. 19, the shaft 31 of the rotary table 21 is supported by a bearing member 30 mounted on the center frame 20a of the base 20, and the bottom face of the rotary table 21 is supported by a plurality of ball casters 32 which are mounted on the base 20 concentrically about the shaft 31. Thus, the rotary table 21 is horizontally rotatable, i.e., the rotary table 21 rotates in parallel with the base 20 (refer to FIG. 8.)

Figure 8:
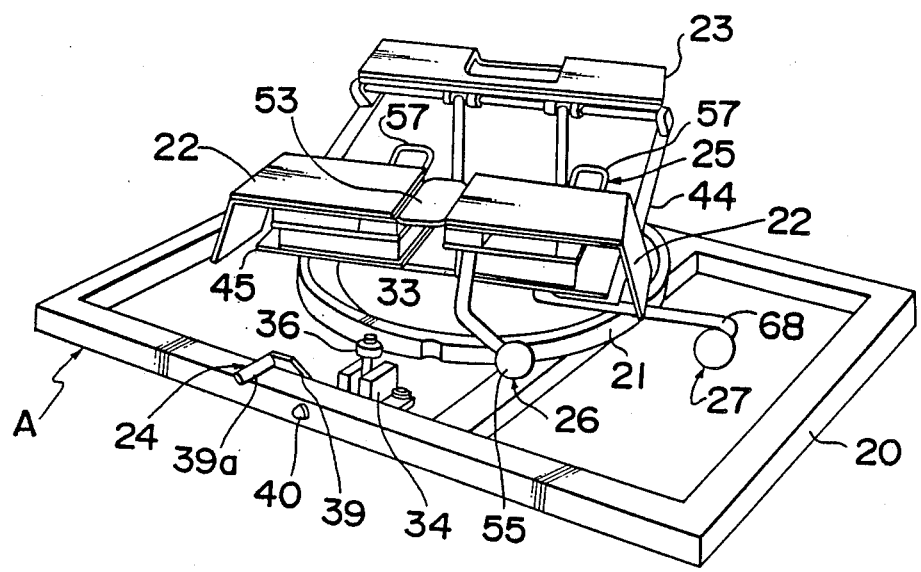
FIG. 8 is a perspective view showing the seat cushion assembling apparatus (A) in a rotated position.
Figure 9:
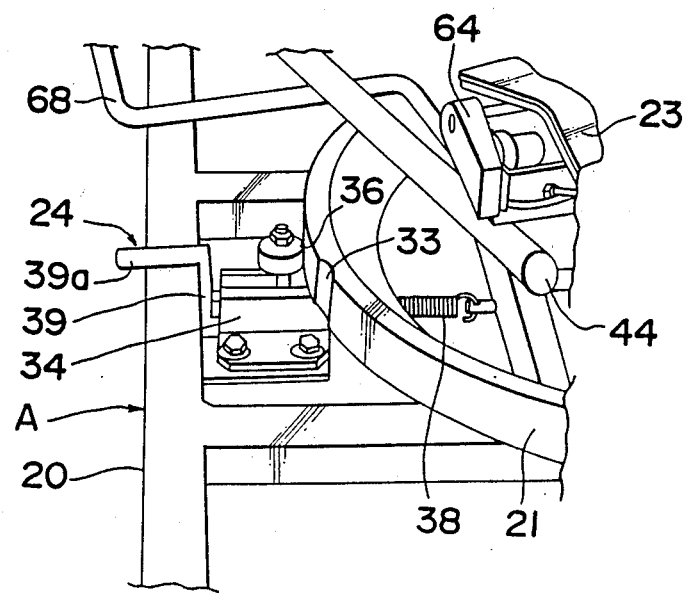
FIG. 9 is a perspective view showing the rotation locking mechanism of the seat cushion assembling apparatus (A)

The rotation locking mechanism 24 of the rotary table 21 is described hereinbelow. As shown in FIG. 18, concave portions 33 are formed on the peripheral face of the rotary table 21 at intervals of 90°. As shown in FIGS. 8, 9, and 19, a roller 36 which can engage with concave portions 33 is mounted on a slide pin 35 which is guided along a rail bracket 34 fixed to the base 20 on the working side thereof and the roller 36 is urged by a coil spring 38, mounted between the slide pin 35 and the pin 37 of the center frame 20a mounted on the base 20, through the slide pin 35 so that the roller 36 engages with the concave portion 33.

Accordingly, the rotary table 21 stops rotating every time it rotates 90°, i.e., the rotary table 21 temporarily stops rotating when the roller 36 fits into any one of the concave portions 33.

As shown in FIGS. 19 and 20, supposing that the base 20 is moved a distance (F) from the center of the slide pin 35, a thick locking lever 39 is pivotally mounted on the base 20 about a bolt 40 as shown in FIG. 8. As a result, the following occurs: when the rotary table 21 is pivoted as well as when it is temporarily locked, the locking lever 39 is pivoted away (unlocking position) from the slide pin 35, and a portion 39a is brought in contact with the top face of the base 20 as shown in FIG. 8. When the locking lever 39 is pivoted to confront the slide pin 35 (locking position) as shown in FIG. 18 in the condition in which the rotary table 21 is temporarily locked, the portion 39a is brought in contact with the top face of the base 20 and the locking lever 39 is pivoted into the gap between the rear portion of the slide pin 35 and the inner face of the base 20. Accordingly, the slide pin 35 is prevented from moving toward the base 20.

Since the roller 36 which has engaged with the concave portion 33 is incapable of moving toward the base 20 together with the slide pin 35, the rotary table 21 is locked when the roller 36 has engaged with the concave portion 33.

As shown in FIGS. 6 and 19, a pair of brackets 43, 43 is vertically mounted on the rotary table 21 and the base portion of a U-shaped setting arm 44 which extends upward is fixed to the rear portion of the brackets 43.

As shown in FIG. 6, a bracket 45 is horizontally fixed to the rear top face of the bracket 43 by bolts 46, 46. As shown in FIG. 20, L-shaped first setting tables 22, 22 on which the rear portion of the seat cushion frame 3 can be placed in position are fixed to slide blocks 48, 48 which are longitudinally guided by rail brackets 47, 47 fixed to both sides of the bracket 45. Protective rubber sheets 50, 50 are attached to the top face of the first setting tables 22, 22.

Figure 14:
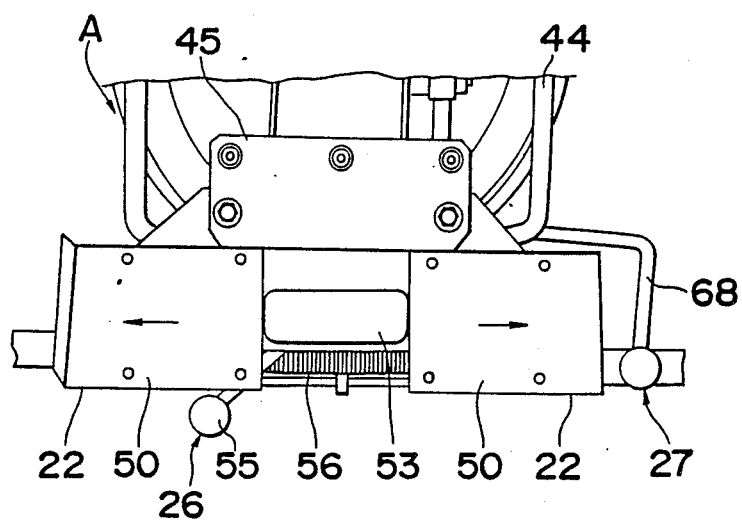
FIG. 14 is a perspective view showing the widened state of a widening/narrowing mechanism.
Figure 15:
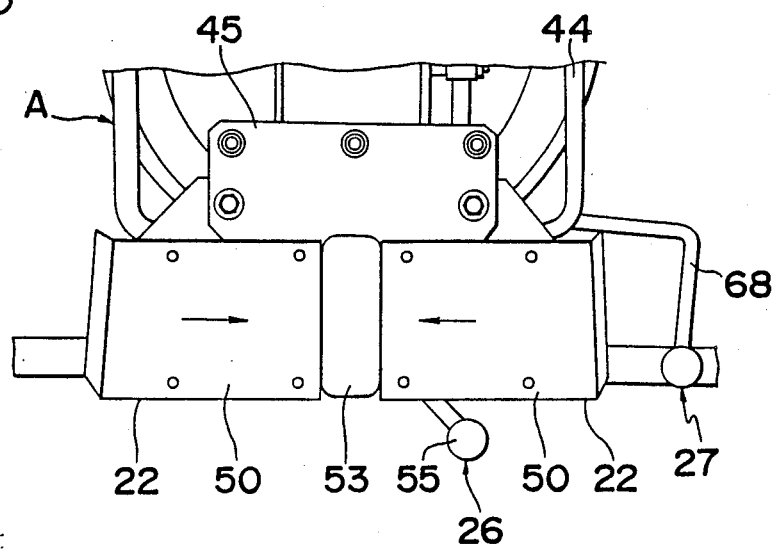
FIG. 15 is a perspective view showing the narrowed state of the widening/narrowing mechanism.

As shown in FIGS. 16 and 20, in the widening/narrowing mechanism 26 for widening or narrowing the distance between the first setting tables 22 and 22, a rectangular plate 53 located between the first setting tables 22 and 22 is horizontally rotatably supported by a supporting shaft 54 in the center of the bracket 45. A grip lever 55 which rotates the plate 53 by 90° is mounted on the supporting shaft 54. That is, the plate 53 rotates between the position as shown in FIG. 14 and, in the position as shown in FIG. 15. A coil spring 56 is mounted between the first setting tables 22, 22 so that the setting tables 22 and 22 are urged inward and brought in to contact with the edges of the plate 53.

According to this construction, when the plate 53 is moved to the position as shown in FIG. 14 by the grip lever 55, the first setting tables 22 and 22 move outward from each other against the urging force of the coil spring 56. As a result, the distance therebetween widens. When the plate 53 is moved to the position as shown in FIG. 15 by the grip lever 55, the first setting tables 22 and 22 move inward toward each other by the urging force of the coil spring 56. As a result, the distance therebetween narrows.

When the distance between the first setting tables 22 and 22 is wide, a wide seat cushion 6 can be assembled. When the distance between the first setting tables 22 and 22 is narrow, a narrow seat back 10 can be assembled.

Figure 7:
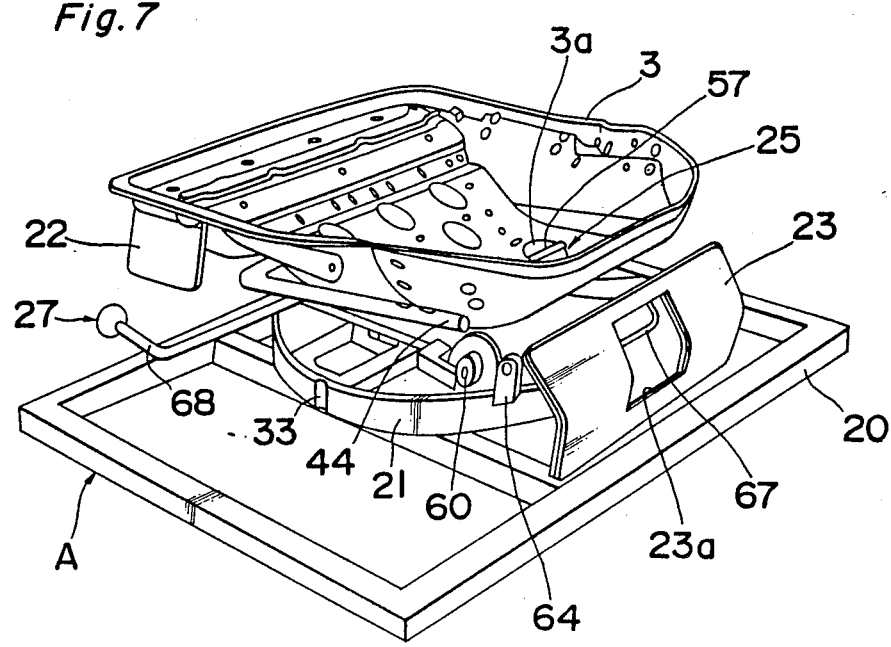
FIG. 7 is a perspective view showing the seat cushion assembling apparatus (A) on which a seat cushion frame is placed with the bottom surface thereof upward.

As shown in FIGS. 6, 18, and 19, a pair of U-shaped locking members 57, 57 which project forward is fixed to the forward portion of the bracket 43. When the rear portion of the seat cushion frame 3 is placed on the first setting tables 22, 22 with the bottom surface thereof upward and both sides thereof are placed in position by the setting arm 44, as shown in FIG. 7, the locking member 57 removably engages with openings 3a, 3a of the seat cushion frame 3, thereby constituting the seat cushion frame locking mechanism 25 for locking, the seat cushion frame 3 placed, with the bottom surface thereof upward, on the first setting tables 22, 22 and the setting arm 44.

As shown in FIGS. 12, 16, 17, and 19, in the upward/downward pivoting mechanism 27 for pivoting the second setting table 23, a supporting bracket 61 is fixed to a rotation shaft 60 rotatably mounted on the forward lower portion of the bracket 43 and an approximately mountain-shaped second setting table 23 is fixed to the top face of the supporting bracket 61. A protective rubber sheet 59 is attached to the top surface of the second setting table 23.

Figure 10:
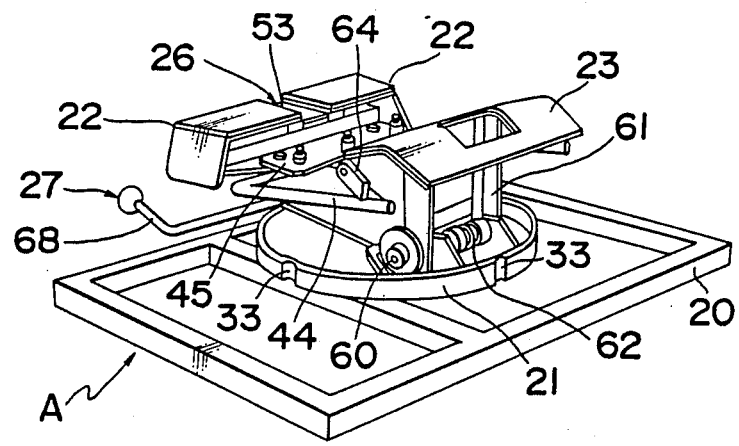
FIG. 10 is a perspective view showing the upward set position of the second setting table of the seat cushion assembling apparatus (A)
Figure 11:
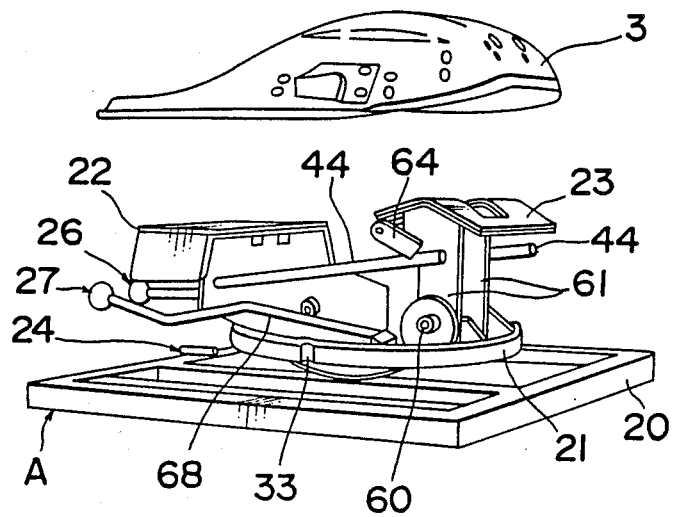
FIG. 11 is a perspective view showing the seat cushion assembling apparatus (A) on which the seat cushion frame is placed with the top surface thereof upward.
Figure 12:
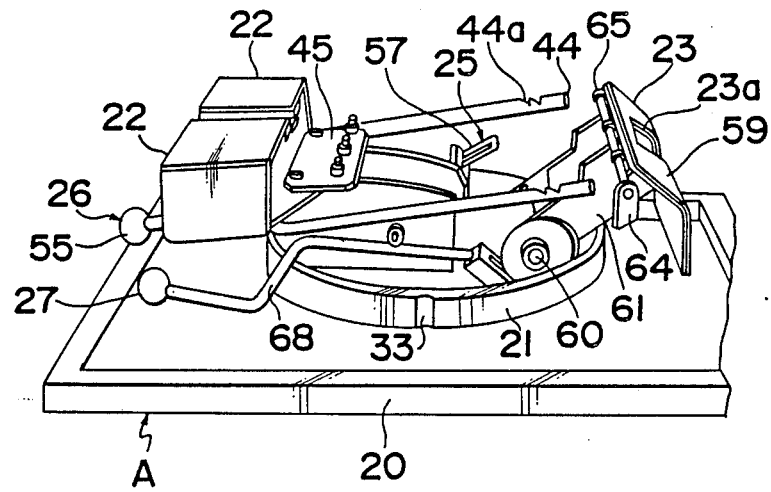
FIG. 12 is a perspective view showing the seat cushion assembling apparatus (A) in which the second setting table is pivoted to the upper set position.

The second setting table 23 pivots together with the supporting bracket 61 about the rotation shaft 60. That is, the second setting table 23 pivots between the downward set position as shown in FIG. 12 and the upward set position as shown in FIGS. 10 and 11.

Referring to FIG. 16, a coil spring 62 wound around the rotation shaft 60 urges the second setting table 23 so that it pivots to take the upward set position in which a stopper 63 fixed to the bracket 43 contacts with the supporting bracket 61, thus locking the supporting bracket 61 as shown in FIG. 19.

Figure 13:
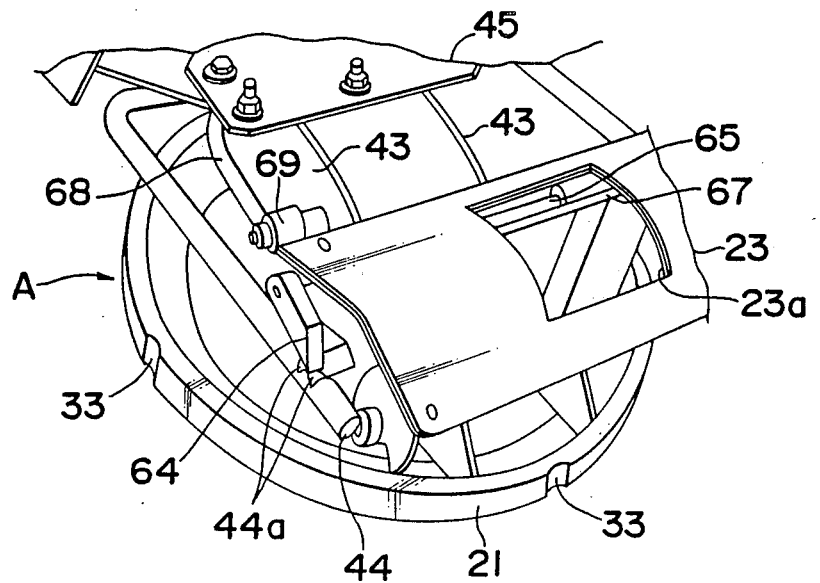
FIG. 13 is a perspective view showing the seat cushion assembling apparatus (A) in which the second setting table is pivoted to the downward set position.

Referring to FIGS. 13 and 19, a plurality of latches 44a are formed on the setting arm 44 and latch claws 64 which can engage with the latches 44a in the upward set position are supported by the rotation shaft 65. The latch claws 64 engage with the latches 44a by dead load, thereby locking the second setting table 23 in the upward set position.

As shown in FIG. 13, a manually operated ring 67 which can be operated through the center opening 23a of the second setting table 23 is fixed to the rotation shaft 65. The latch claws 64 are disengaged from the latches 44a by the operation of the manually operated ring 67. As a result, the second setting table 23 can be pivoted together with the supporting bracket 61 to the downward set position against the urging force of the coil spring 62.

As shown in FIGS. 16 and 17, the bearing ring 69 of a grip lever 68 is mounted on the side of the bracket 43 so as to be pivotal about a pin 70. The grip lever 68 is urged in the downward direction by a spring 71 mounted between the rear edge portion of the grip lever 68 and the portion 43a projecting from the bracket 43.

A roller 72 is fixed to the front end portion of the grip lever 68. A disk 73 whose peripheral face contacts with the roller 72 is fixed to the end portion of the rotation shaft 60 of the supporting bracket 61. A concave portion 73a is formed on the locking disk 73. The roller 72 engages with the concave portion 73a when the second setting table 23 is pivoted to the downward set position.

Accordingly, when the second setting table 23 is manually rotated toward the downward set position together with the supporting bracket 61, the roller 72 of the grip lever 68 which has been urged in the upward direction engages with the concave portion 73a of the locking disk 73, thereby locking the second setting table 23 in the downward set position. When the rear portion of the grip lever 68 is manually pivoted upward, the roller 72 disengages from the concave portion 73a. As a result, the second setting table 23 is pivoted toward the upward set position together with the supporting bracket 61 by the urging force of the coil spring 62 and brought in contact with the stopper 63, thus being locked by the stopper 63, and the latch claw 64 engages with the latch 44a of the setting arm 44. Thus, the second setting table 23 is locked in the upward set position.

Referring to FIG. 11, in the upward set position of the second setting table 23, the rear portion of the seat cushion frame 3 can be placed in position on the first setting tables 22, 22 with the top surface thereof upward and the front portion thereof can be placed in position on the second setting table 23.

According to the seat cushion assembling apparatus (A) having the above-described construction, first, as shown in FIG. 7, a worker places the seat cushion frame 3 on the first setting tables 22, 22 and the setting arm 44 in position with the bottom surface thereof upward, then the opening 3a is locked by the locking member 57 of the locking mechanism 25 so that the seat cushion frame 3 is not moved on the first setting tables 22, 22.

In this condition, the seat cushion frame 3 is covered with the seat cushion trim 5 with the seat cushion pad 4 applied to the seat cushion frame 3 while the rotary table 21 is being rotated.

Thereafter, the locking member 57 is disengaged from the opening 3a, then the seat cushion frame 3 is lifted and the rear portion of the grip lever 68 is pivoted upward. As a result, the roller 72 disengages from the locking disk 73, the second setting table 23 is pivoted to the upward set position by the urging force of the coil spring 62, and the latch claw 64 engages with the latch 44a of the setting arm 44, thereby locking the second setting table 23 in the upward set position as shown in FIG. 10.

Thereafter, the seat cushion frame 3 (seat cushion sub-assembled frame 3) is placed on the first setting table 22 and the second setting table 23 in position with the top surface of the seat cushion sub-assembled frame 3 upward (refer to FIG. 11.) In this condition, while the rotary table 21 is being rotated, the end portion of the seat cushion trim 5 is wound around the seat cushion frame 3 and the end portion of the seat cushion trim 5 is fastened to the seat cushion frame 3. Thus, the seat cushion 6 is manufactured.

The seat back 10 is manufactured by a manufacturing line different from that of the seat cushion as described above, but the distance between the first setting tables 22 and 22 is narrowed by operating the grip lever 55 of the mechanism 26 so that the seat back 10 which is narrow in its width can be placed in position on the seat cushion assembling apparatus (A). Thus, parts may be mounted on the seat back 10.

According to the seat cushion assembling apparatus (A), since the locking mechanism 25 locks the seat cushion frame 3 (seat cushion sub-assembled frame 3) placed in position on the first setting tables 22, 22, the second setting table 23, and the setting arm 44 mounted on the rotary table 21 disposed above the base 20, the seat cushion frame 3 (seat cushion sub-assembled frame 3) is stabilized and is not shaken on the first setting tables 22, 22 and the second setting table 23. Accordingly, those not skilled in the art can easily cover the seat cushion frame 3 (seat cushion sub-assembled frame 3) with the seat cushion trim 5, wind the end portion of the seat cushion trim 5 around the seat cushion frame 3 (seat cushion sub-assembled frame 3), and fasten the end portion of the seat cushion trim 5 to the seat cushion frame 3 (seat cushion sub-assembled frame 3).

Further, the first setting tables 22, 22 and the second setting table 23 are horizontally pivoted by the rotary table 21 which is manually rotated without applying a great amount of force thereto and further, locked by the locking mechanism 24. Accordingly, the worker can easily cover the entire seat cushion frame 3 (seat cushion sub-assembled frame 3) with the seat cushion trim 5, wind the end portion of the seat cushion trim 5 around the seat cushion frame 3 (seat cushion sub-assembled frame 3), and fasten the end portion of the seat cushion trim 5 to the seat cushion frame 3 while the worker is standing alongside the belt conveyor 2.

Furthermore, the upward/downward pivoting mechanism 27 allows the second setting table 23 to move upward or downward. Therefore, the end portion of the seat cushion trim 5 can be easily wound around the seat cushion frame 3 and the end portion of the seat cushion trim 5 can also be easily fastened to the seat cushion frame 3 with the top surface of the seat cushion frame 3 covered with the seat cushion trim 5 upward because the seat cushion frame 3 is stabilized and firmly supported by the first and second setting tables 22 and 23.

In addition, the worker can work with his hands positioned as high as his waist while the worker is standing on the side of the belt conveyor.

Seat assembling apparatus B

A seat assembling apparatus (B) in accordance with the present invention is described with reference to FIGS. 21 through 35.

Figure 21:
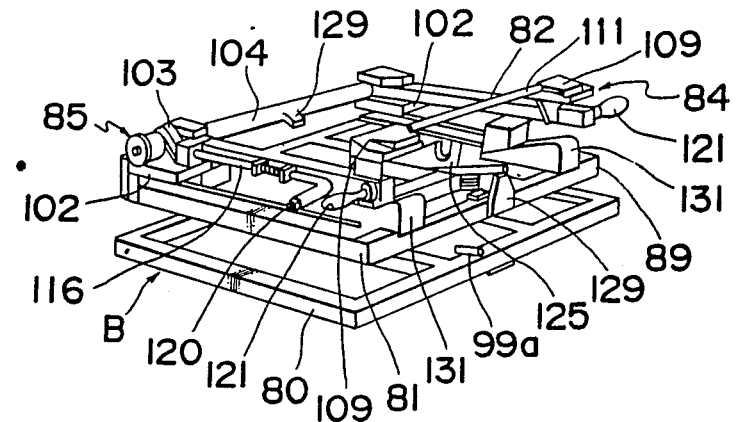
FIG. 21 is a perspective view showing the lower set position of the setting table of the seat assembling apparatus (B)
Figure 22:
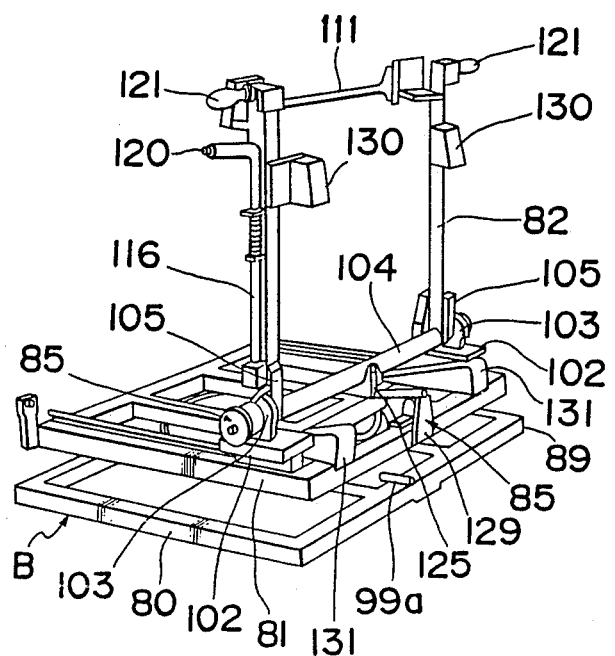
FIG. 22 is a perspective view showing the upper set position of the setting table of the seat assembling apparatus (B)

As shown in FIGS. 21 and 22, the seat assembling apparatus (B) comprises a horizontally rotatable rotary table 81 mounted on a base 80; a setting table 82 which is mounted on the rotary table 81, horizontally movable, vertically pivotal, and on which the seat slider 7 is placed in position; a rotation locking mechanism 83 (refer to FIG. 24) for locking the rotary table 81 at a predetermined rotational position thereof; a locking mechanism 84 refer to FIG. 21 for locking the seat slider 7 on the setting table 82; and pivot locking mechanism 85 for locking the setting table 82 in an upper set position.

The base 80 comprises a rectangular frame (see FIG. 21) and is placed on the belt coveyor 2.

Figure 23:
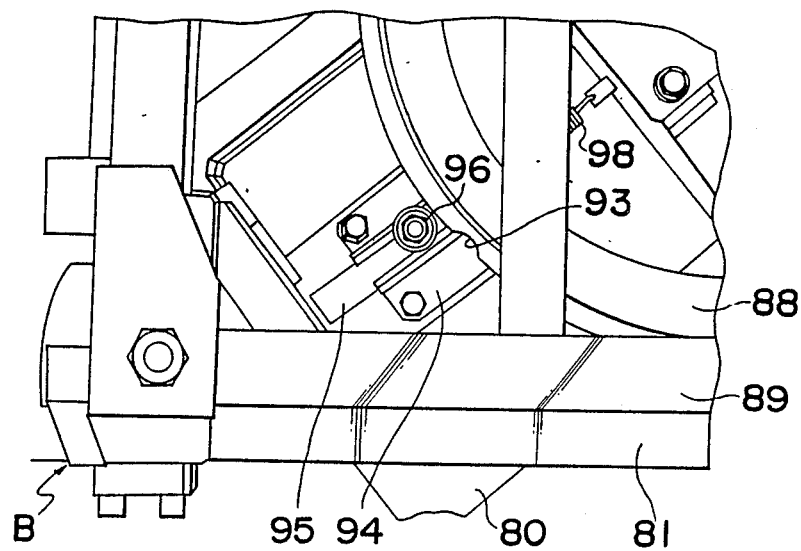
FIG. 23 is a perspective view showing the unlocking state of a rotation locking mechanism.
Figure 33:
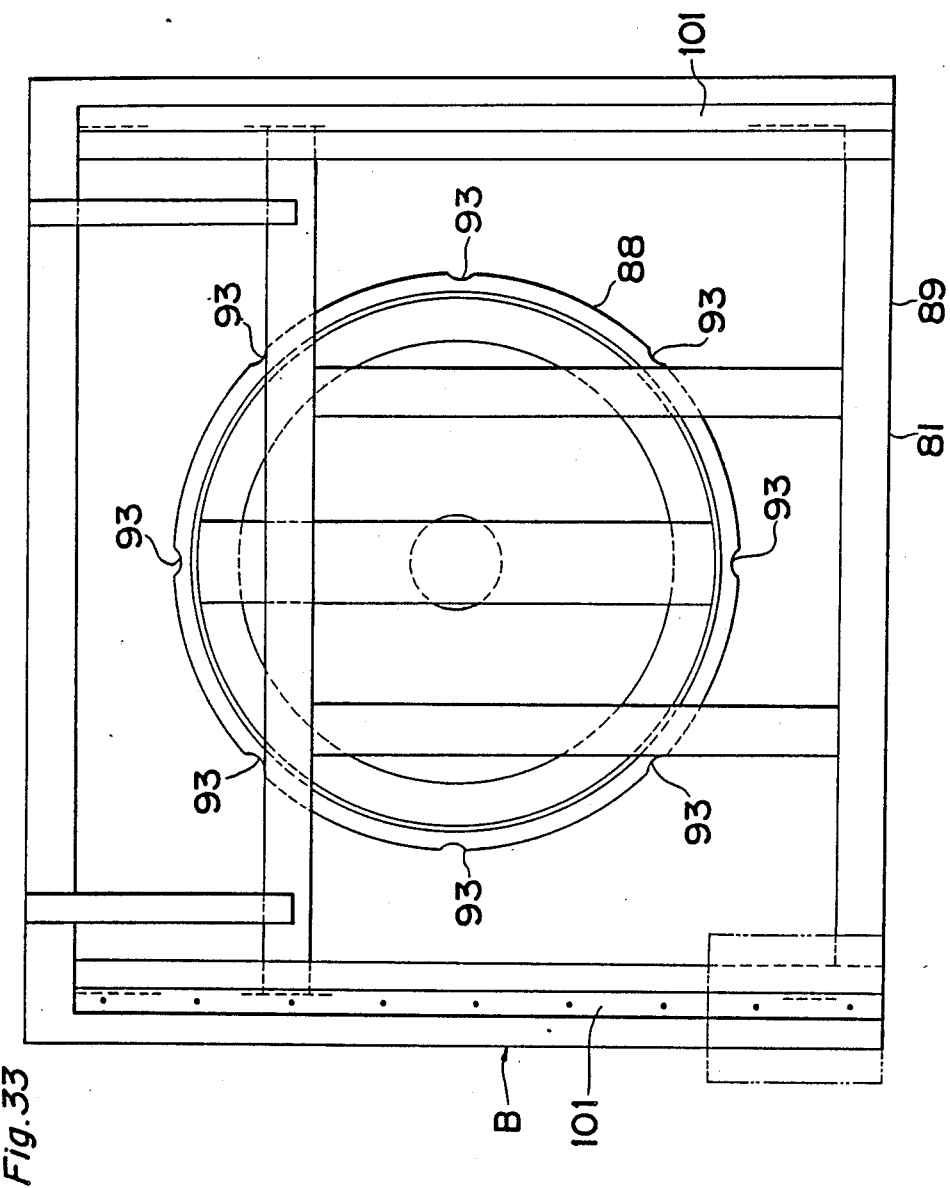
FIG. 33 is a front view showing a rotary table.

As shown in FIG. 33, the rotary table 81 comprises a circular frame 88 and a rectangular frame 89 fixed to the top face of the circular frame 88. Referring to FIG. 35, the center shaft 91 of the rectangular frame 89 is rotatably supported by a bearing member 90 mounted on the center frame 80a of the base 80, and the bottom face of the rotary table 81 is supported by a plurality of ball casters 92 which are mounted on the base 80 concentrically about the shaft 91. Thus, the rotary table 81 is horizontally rotatable, i.e., the rotary table 81 rotates in parallel with the base 80 as shown in FIG. 23.

Figure 24:
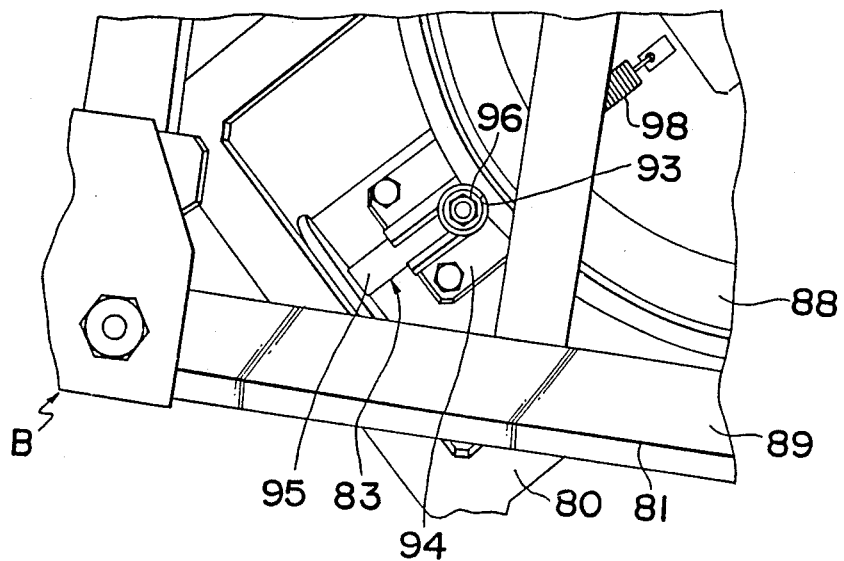
FIG. 24 is a perspective view showing the locking state of the rotation locking mechanism.
Figure 25:
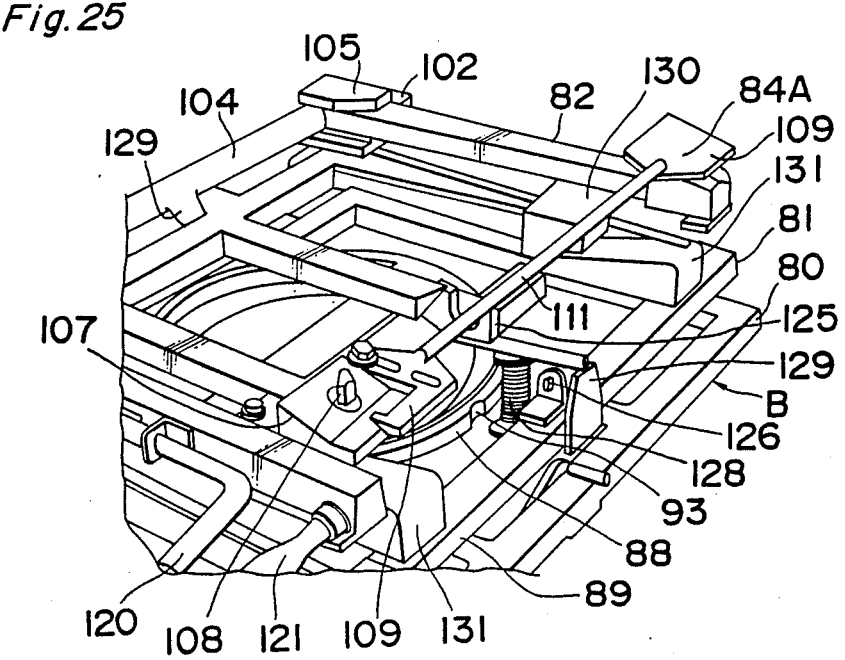
FIG. 25 is a perspective view showing the unlocking state of a locking mechanism.
Figure 26:
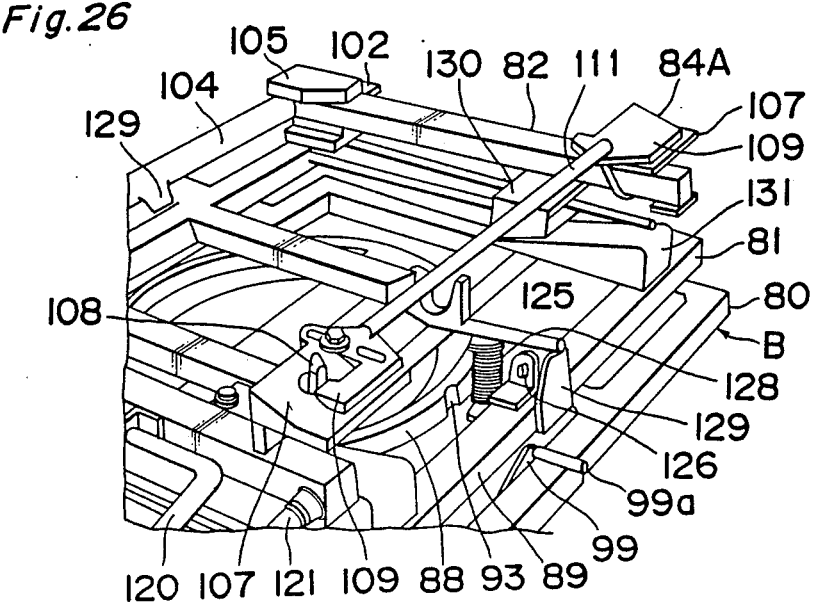
FIG. 26 is a perspective view showing the locking state of the locking mechanism.
Figure 34:
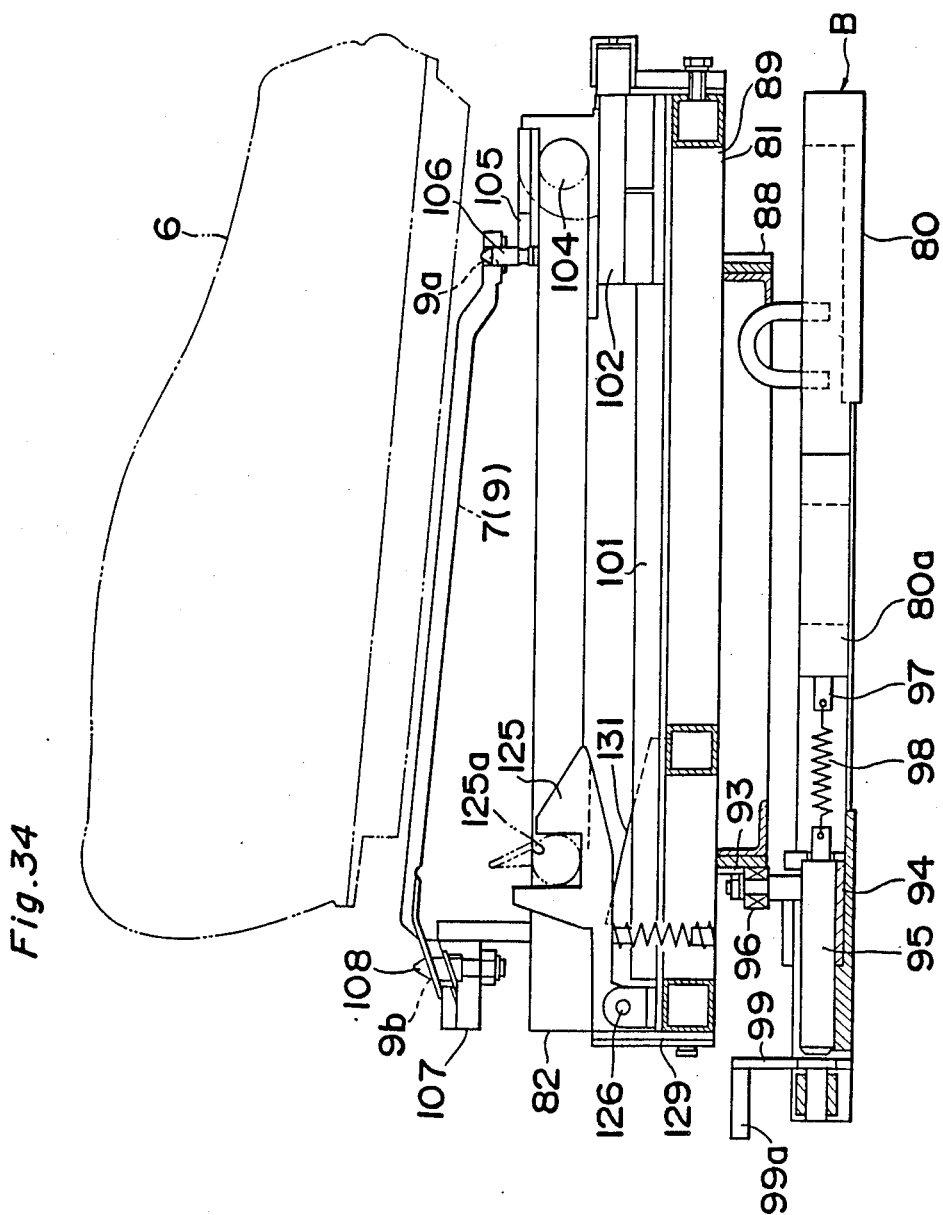
FIG. 34 is a side elevational view of the seat assembling apparatus (B)

The rotation locking mechanism 83 of the rotary table 81 is described hereinbelow. As shown in FIG. 23, concave portions 93 are formed on the peripheral face of the circular frame 88 at intervals of 45° with respect to the center of the circular frame 88. As shown in FIGS. 23, 24, and 34, a roller 96 which can engage with concave portions 93 is mounted on a slide pin 95 which is guided along a rail bracket 94 fixed to the base 80 on the working side thereof, and the roller 96 is urged by a coil spring 98, mounted between the slide pin 95 and the pin 97 of the center frame 80a mounted on the base 80, through the slide pin 95 so that the roller 96 engages with the concave portion 93.

Accordingly, the rotary table 81 stops rotating every time it rotates 45°, i.e., the rotary table 81 temporarily stops rotating when the roller 96 fits into any one of the concave portions 93.

Figure 28:
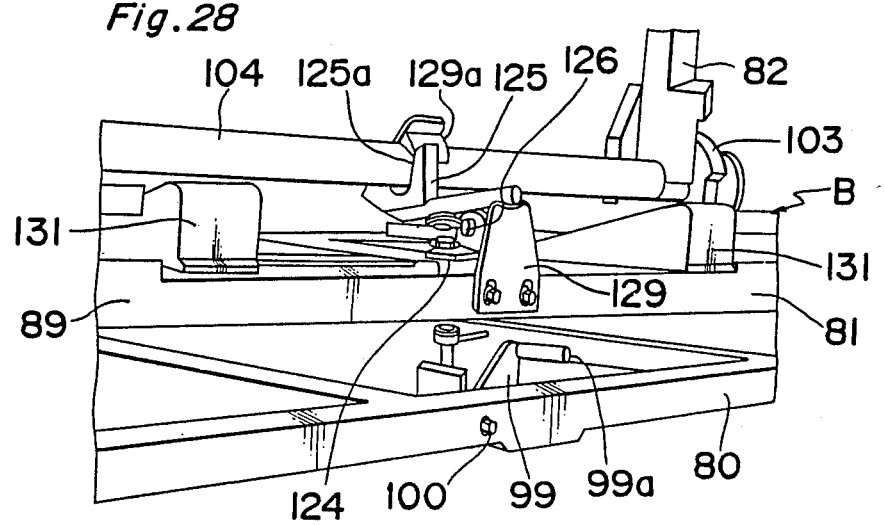
FIG. 28 is a perspective view showing the locking lever which is fitted in a concave portion.
Figure 29:
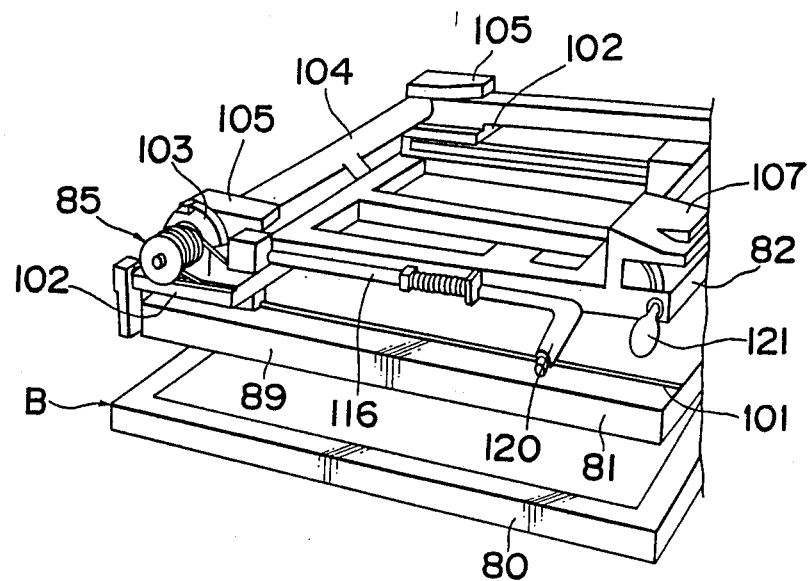
FIG. 29 is a perspective view showing a setting table in a position immediately before it is pivoted to the upper set position.

As shown in FIG. 28, supposing that the base 80 is moved a distance from the center of the slide pin 95, a thick locking lever 99 is pivotally mounted on the base 80 about a bolt 100. As a result, the following occurs. When the rotary table 81 is pivoted as well as when it is temporarily locked, the locking lever 99 is pivoted away (unlocking position) from the slide pin 95 and the portion 99a is brought in contact with the the top face of the base 80. When the locking lever 99 is pivoted to confront the slide pin 95 (locking position) in the condition in which the rotary table 81 is temporarily locked, the portion 99a is brought in contact with the top face of the base 80 and the locking lever 99 is pivoted into the gap between the rear portion of the slide pin 95 and the inner face of the base 80. Accordingly, the slide pin 95 is prevented from moving toward the base 80.

Since the slide pin 95 and the roller 96 which has engaged with the concave portion 93 are incapable or moving toward the base 80, the rotary table 81 is locked when the roller 96 has engaged with the concave portion 93.

Figure 30:
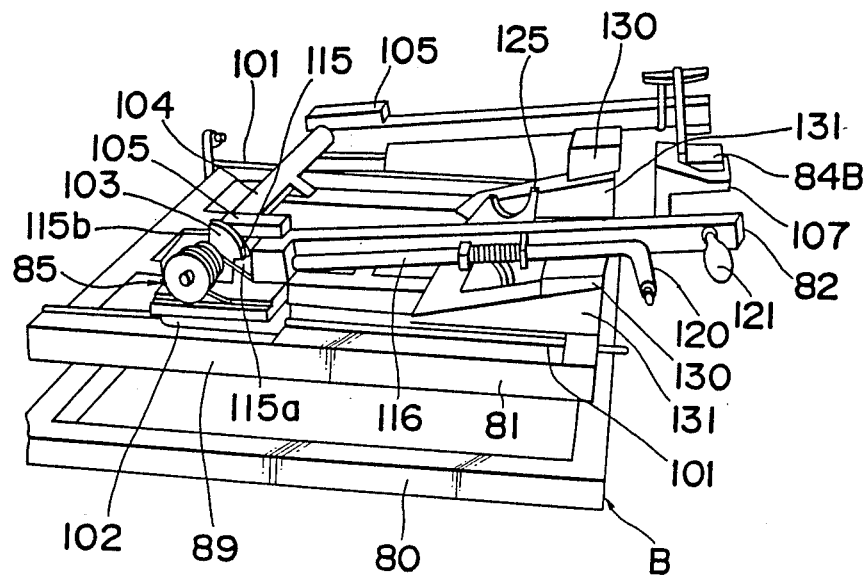
FIG. 30 is a perspective view showing the setting table which is being pivoted toward the upper set position.

As shown in FIGS. 30, 33, and 35, each of longitudinally a pair of rails extending 101, 101 is provided on the top portion of each respective side of the rectangular frame 89 of the rotary table 81. Slide blocks 102, 102 mounted on the front portions of the setting table 82 are longitudinally guided along the rails 101 and 101.

A pair of brackets 103, 103 is vertically fixed to the slide blocks 102, 102, respectively, and, rotation shaft 104 of the rectangular setting tables 82 is mounted on the brackets 103 and 103, respectively.

As shown in FIGS. 31 and 32, front brackets 105, 105 disposed on the front portions of both sides of the setting table 82 are provided with rear positioning pins 106, 106 which are fitted downwards into the rear mounting openings 9a and 9a (refer to FIG. 2(a)) of the lower rails 9, 9 of the seat slider 7. Rear brackets 107, 107 disposed on the rear portions of both sides of the setting table 82 are provided with rear positioning pins 108, 108 which are fitted downwards into the rear mounting openings 9b and 9b (refer to FIG. 2(b)) of the lower rails 9 and 9 of the seat slider 7.

Referring to FIG. 31, locking claws 109, 109 which are longitudinally guided by an elongated opening 109a and a bolt 110 are mounted on the rear brackets 107, 107 of the setting table 82, respectively. The locking claws 109 and 109 are connected to each other by a locking claw shaft 111. When the locking claw shaft 111 is longitudinally moved, the locking claws 109, 109 are moved from the rear position shown in FIG. 25 to the front position shown in FIG. 26, thereby locking the front flanges 9c, 9c (refer to FIG. 2(a)) of the lower rails 9, 9 of the seat slider 7 so that the front portion of the seat slider 7 may not be moved on the setting table 82. These elements define the locking mechanism 84a for locking the front portion of the seat slider 7.

As shown in FIG. 31, a locking claw 133 which is guided widthwise by an elongated opening 133a and a bolt 134 are mounted on the front brackets 105, 105 of the setting table 82, and a grip 135 is mounted on the locking claws 133, 133. When the locking claw 133 is moved outwards by the grip 135, the rear flanges 9d of the lower rails 9 are locked. These elements define the locking mechanism 84 for locking the rear portion of the seat slider 7 on the setting table 82.

Since the rotation shaft 104 of the setting table 82 is mounted on the respective brackets 103, 103 of the slide block 102, the setting table 82 is pivotable between the lower set position approximately parallel with the rectangular frame 89 as shown in FIG. 21 and the upper set position approximately perpendicular to the rectangular frame 89 as shown in FIG. 22.

Referring to FIG. 31, coil springs 114, 114 are mounted on both end portions of the rotation shaft 104. The coil springs 114, 114 urge the setting table 82 to pivot to the upper set position.

Referring to FIGS. 30 and 32, in the pivot locking mechanism 85 of the setting table 82, a cam 115 on which the lower locking portion 115a and the upper locking portion 115b are formed is mounted on each of the brackets 103 of the slide blocks 102. The locking shafts 116, 116 are longitudinally movably supported by guide members 117, 117 and 117a, 117a mounted on both sides of the setting table 82. A coil spring 119 mounted between the ring 118 of the locking shaft 116 and the guide member 117a urges each of the locking shafts 116, 116 toward the forward direction. The top portion of the locking shaft 116 is engaged with the lower locking portion 115a in the lower set position of the setting table 82. Thus, the setting table 82 is locked in the lower set position against the urging force of the coil spring 114. The top portion of the locking shaft 116 is engaged with the upper locking portion 115b in the upper set position. Thus, the setting table 82 is locked in the upper position.

A manually operated grip 120 for pulling the locking shaft 116 out of the locking portions 115a, 115b is mounted on the rear portion of the locking shaft 116. A stationary grip 121 to aid in pulling the grip 120 is mounted on the rear portions of both sides of the setting table 82.

Figure 27:
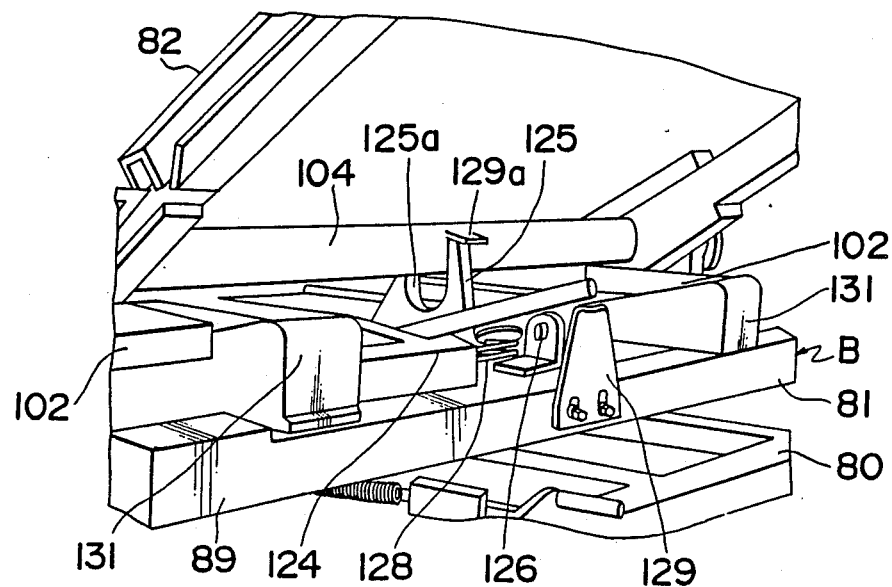
FIG. 27 is a perspective view showing the pressdown state of a locking lever.

As shown in FIG. 27 and 28, a locking lever 125 is pivotally mounted by a pin 126 on the bracket 124 mounted on the rear middle portion of the rectangular frame 89 of the rotary table 81. A concave portion 125a is formed on the locking lever 125 so as to allow the rotation shaft 104 of the setting table 102 to be fitted thereinto from an upper direction. The locking lever 125 is urged in the upper set position by a coil spring 128 mounted between the locking lever 125 and the rectangular frame 89. In this condition, the rear portion of the locking lever 125 is brought in contact with a bracket 129 mounted on the rear middle portion of the rectangular frame 89. Thus, the locking lever 125 is locked by the bracket 129.

The rotation shaft 104 of the setting table 82 is fixedly provided with a pressing member 129a which presses down the locking lever 125 when the setting table 82 is pivoted to the lower set position against the urging force of the coil spring 114. Thus, the pressing member 129 disengages the rotation shaft 104 from the concave portion 125a of the locking lever 125.

As shown in FIGS. 21, 22 and 30, wedge-shaped tilted blocks 130, 130 are fixed to the rear portions of both sides of the rectangular frame 89 and tilted blocks 131, 131 on which the tilted blocks 130, 130 are capable of mounting are fixed to the rear top surfaces of both sides of the rectangular frame 89.

Accordingly, when the grips 120 and 121 are pulled toward a worker, the slide block 102 is guided along the rail 101, with the result that the setting table 82 is moved backward. While the setting table 82 is being moved backward, the rear portion of the setting table 82 pivots upwardly as the blocks 130 ride up on the tilted blocks 131. Utilizing the reaction of the setting table 82 due to the mounting thereof on the tilted blocks 130 and 131, when the setting table 82 is further moved backward while it is being pivoted counter-clockwise, the rotation shaft 104 is fitted into the concave portion 125a of the locking lever 125. Thus, the setting table 82 is locked in the upper set position.

When the setting table 82 is pivoted clockwise, the press-down member 129 of the rotation shaft 104 presses down the locking lever 125, with the result that the rotation shaft 104 disengages from the concave portion 125a of the locking lever 125. Thereafter, the setting table 82 is moved forward while it is being pivoted clockwise. Thus, the setting table 82 can be returned to the lower set position.

In the seat assembling apparatus having the above-described construction, first, as shown in FIG. 31, the positioning pins 106, 106, 108, and 108 of the setting table 82 are inserted into the mounting openings 9a, 9a, 9b, and 9b of the lower rail 9 of the seat slider 7, then the seat slider 7 is placed in position on the setting table 82. Thereafter, the seat slider 7 is locked by the locking claws 109, 109 of the locking mechanism 84A and the locking claws 133, 133 of the locking mechanisms 84B. Then, the seat cushion 6 manufactured by the seat cushion assembling apparatus (A) is placed on the seat slider 7. In this condition, the seat cushion 6 is fixed to the seat slider 7 with bolts while the rotary table 81 is being manually rotated.

Thereafter, the grip 120 of the setting table 82 is pulled so that the locking shaft 116 is disengaged from the lower locking portion 115a of the bracket 103. Next, the setting table 102 is pulled toward the worker by means of the grips 120 and 121, with the result that the slide block 102 of the setting table 82 is guided along the rail 101 of the rectangular frame 89. Thus, the setting table 82 is moved backward. While the setting table 82 is being moved backward, the rear portion of the setting table 82 mounts on the tilted blocks 130 and 131. Utilizing the reaction of the setting table 82 due to the mounting thereof on the tilted blocks 130 and 131, the setting table 82 is further moved backward while it is being pivoted counterclockwise. As a result, the rotation shaft 104 is fitted into the concave portion 125a of the locking lever 125. Thus, the setting table 82 is longitudinally locked in the upper set position.

Thereafter, when the grip 120 is released, the locking shaft 116 engages with the upper locking concave portion 115b. Thus, the setting table 82 is locked in the upper set position.

In this condition, the worker mounts parts on the bottom surface of the seat cushion 6.

Next, the grip 120 of the setting table 82 is pulled to disengage the locking shaft 116 from the upper locking portion 115b of the bracket 103. Then, the setting table 82 is pivoted clockwise by means of the grips 120 and 121. As a result, the press-down member 129a of the rotation shaft 104 presses down the locking lever 125, whereby the rotation shaft 104 disengages from the concave portion 125a. Thereafter, the setting table 82 is pressed to pivot clockwise and move it forward. Thus, the setting table 82 is returned to the lower set position.

Thereafter, when the grip 120 is released, the locking shaft 116 is fitted into the lower concave portion 115a of the bracket 103. Thus, the rotary table 82 is locked in the lower set position.

In this condition, the worker fixes the seat back 10 to the seat cushion 6 by means of bolts and then mounts the head wrest 14 on the seat back 10 while the rotary table 81 is being manually rotated. Thus, the seat 15 is manufactured.

Then, the locking claws 109 and 133 for locking the seat slider 9 are disengaged from the seat slider 7 and the manufactured seat 15 is removed from the seat assembling apparatus (B). Thus, the seat assembling operation is completed.

According to the seat assembling apparatus (B), since the seat slider 7 placed in position on the setting table 82 mounted on the rotary table 81 of the base 80 is locked by the locking mechanism 84A and 84B, the seat slider 7 is stabilized and not moved on the setting table 82. Thus, seat cushion and seat back mounting operations can be accomplished easily and without wasting time and labor.

Further, the setting table 82 is horizontally rotated by the rotary table 81 without applying a great amount of force to the rotary table 81 and can be locked by the locking mechanism 83. Accordingly, standing alongside the belt conveyor 2, the worker can easily perform the operations for mounting the seat cushion 6 and the seat back 10.

In addition, the pivot locking mechanism 85 locks the setting table 82 in the upper set position. Therefore, parts can be easily mounted on the bottom surface of the seat cushion 6.

Furthermore, the worker can work at a height appropriate to each operation while standing alongside the belt conveyor 2.

As shown in FIG. 1, the seat 15 can be manufactured by one assembly-line, i.e., the seat cushion assembling apparatus (A) and the seat assembling apparatus (B) are alternately arranged on the belt conveyor 2 of the manufacturing line. Therefore, the production efficiency of the seat 15 can be greatly improved.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A seat assembling apparatus comprising:
   a substantially horizontal base;
   a substantially horizontal rotary table rotatably mounted to said base about a substantially vertical axis and having a front end, a rear end, and first and second sides;

a setting table having a first end and a second end;

mounting means for mounting said setting table to said rotary table for movement between a first position in which said setting table is substantially horizontal, said first end of said setting table is adjacent said front end of said rotary table and said second end of said setting table is adjacent said rear end of said rotary table, and a second position in which said setting table is substantially vertical, said first end of said setting table is adjacent said rear end of said rotary table and said second end of said setting table is spaced upwardly from said first end of said setting table; and means for temporarily attaching a seat to said setting table.

2. A seat assembling apparatus as recited in claim 1, wherein said mounting means comprises:

slide mount means for slidably mounting said first end of said setting table for movement between a front position adjacent said front end of said rotary table and a rear position adjacent said rear end of said rotary table; and pivot means for pivotally mounting said setting table to said rotary table for movement between a substantially horizontal position and a substantially vertical position.

3. A seat assembling apparatus as recited in claim 2, wherein said slide mount means comprises:

an elongated slide rail fixed to said rotary table and extending between said front and rear ends of said rotary table; and a slide block mounted to said first end of said setting table and slidably mounted to said slide rail.

4. A seat assembling apparatus as recited in claim 3, wherein said pivot mount means comprises a horizontal pivot shaft fixed to said first end of said setting table and rotatably mounted to said slide block.

5. A seat assembling apparatus as recited in claim 4, further comprising setting table lock means for selectively locking said setting table in said first position and in said second position.

6. A seat assembling apparatus as recited in claim 4, further comprising rotary table lock means for locking said rotary table against rotation relative to said base.

7. A seat assembling apparatus as recited in claim 6, wherein said rotary table is circular; and said rotary table lock means comprises:

concave roller receiving indentations spaced along the periphery of said rotary table;

a roller; and means for movably mounting said roller for movement between an engaged position in which said roller is engaged in one of said roller receiving indentations and a disengaged position in which said roller is free from engagement in one of said roller receiving indentations.

8. A seat assembling apparatus as recited in claim 7, wherein said rotary table lock means further comprises biasing means for biasing said roller toward said rotary table such that said roller will ride along the circumference of said rotary table as said rotary table turns until said roller encounters one of said roller receiving indentations at which time said roller will move to its engaged position and lock said rotary table against rotation relative to said base.

9. A seat assembling apparatus as recited in claim 8, further comprising means for locking said roller in its engaged position.

10. A seat assembling apparatus as recited in claim 5, wherein said setting table lock means comprises:

pivot lock means for selectively locking said setting table in said horizontal position and in said vertical position; and slide lock means for locking said setting table against sliding movement relative to said rotary table.

11. A seat assembling apparatus as recited in claim 10, wherein said pivot lock means comprises:

a cam member, having first and second locking portions formed thereon, fixed to said slide block;

a locking shaft slidably mounted to said setting table; and spring means for biasing said locking shaft into engagement with said cam member such that when said setting table is pivoted to said horizontal position said locking shaft engages said first locking portion so as to lock said setting table in said horizontal position and when said setting table is pivoted to said vertical position said locking shaft engages said second locking portion so as to lock said setting table in said vertical position.

12. A seat assembling apparatus as recited in claim 10, wherein said slide lock means comprises:

a locking lever having a jaw;

means for mounting said locking lever to said rotary table for pivotal movement between a lock position in which said horizontal pivot shaft is engaged by said jaw and an unlock position in which said pivot shaft is free from engagement with said jaw; and means for biasing said locking lever toward said lock position.

13. A seat assembling apparatus as recited in claim 1, further comprising setting table lock means for selectively locking said setting table in said first position and in said second position.

14. A seat assembling apparatus as recited in claim 13, further comprising rotary table lock means for locking said rotary table against rotation relative to said base.

15. A seat assembling apparatus as recited in claim 2, further comprising pivot lock means for selectively locking said setting table in said horizontal position and in said vertical position; and slide lock means for locking said setting table against sliding movement relative to said rotary table.

16. A seat assembling apparatus as recited in claim 15, wherein said pivot lock means comprises:

a cam member, having first and second locking portions formed thereon, fixed to said slide block;

a locking shaft slidably mounted to said setting table; and spring means for biasing said locking shaft into engagement with said cam member such that when said setting table is pivoted to said horizontal position said locking shaft engages said first locking portion so as to lock said setting table in said horizontal position and when said setting table is pivoted to said vertical position said locking shaft engages said second locking portion so as to lock said setting table in said vertical position.

17. A seat assembling apparatus as recited in claim 15, wherein
said slide lock means comprises:
a locking lever having a jaw;
means for mounting said locking lever to said rotary table for pivotal movement between a lock position in which said horizontal pivot shaft is engaged by said jaw and an unlock position in which said pivot shaft is free from engagement with said jaw; and
means for biasing said locking lever toward said lock position.

* * * * *